Figure 2:
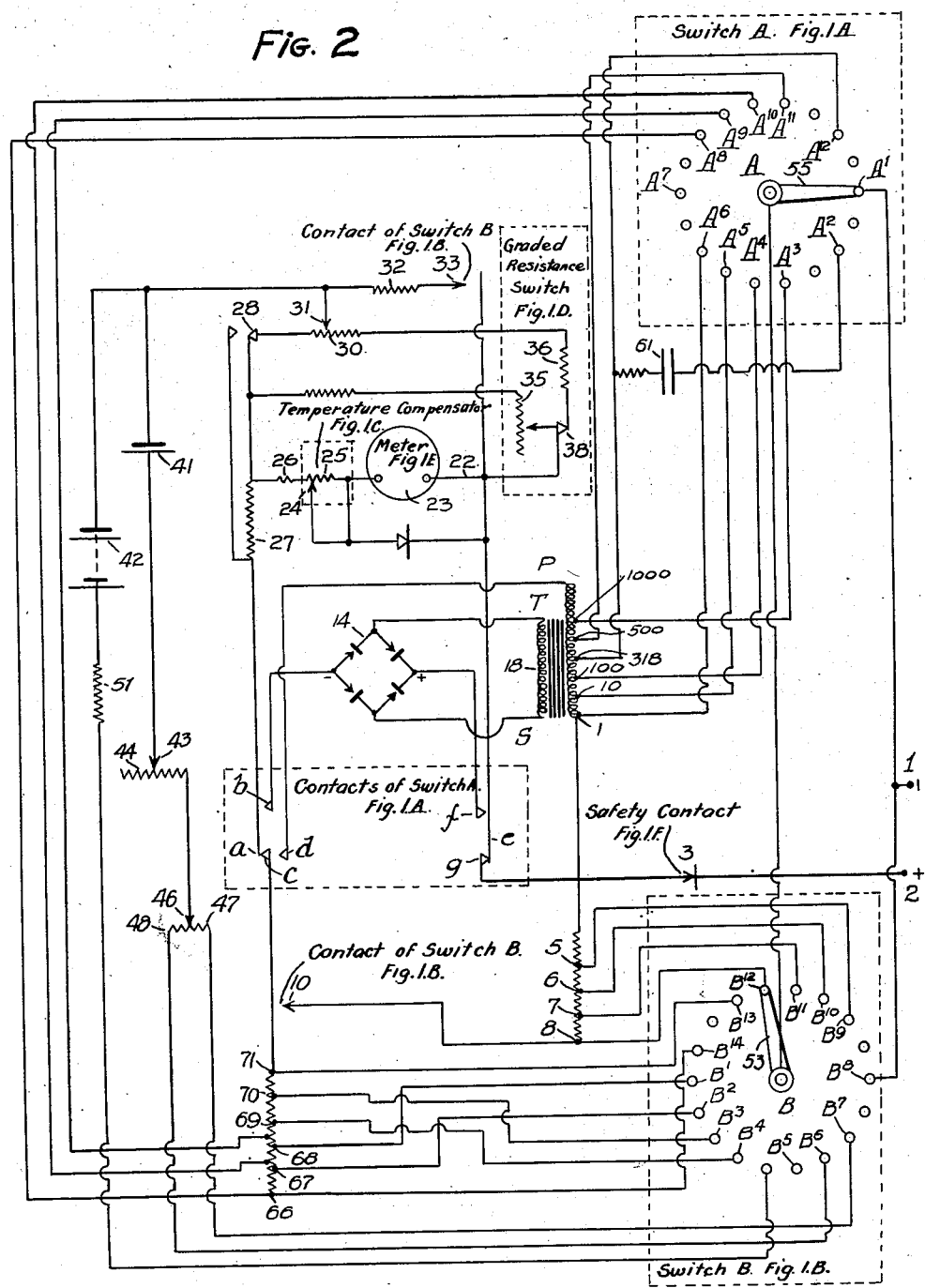

May 31, 1938.     H. S. MACADIE     2,118,933
MULTIRANGE ELECTRICAL MEASURING INSTRUMENT
Filed May 17, 1937     3 Sheets-Sheet 1
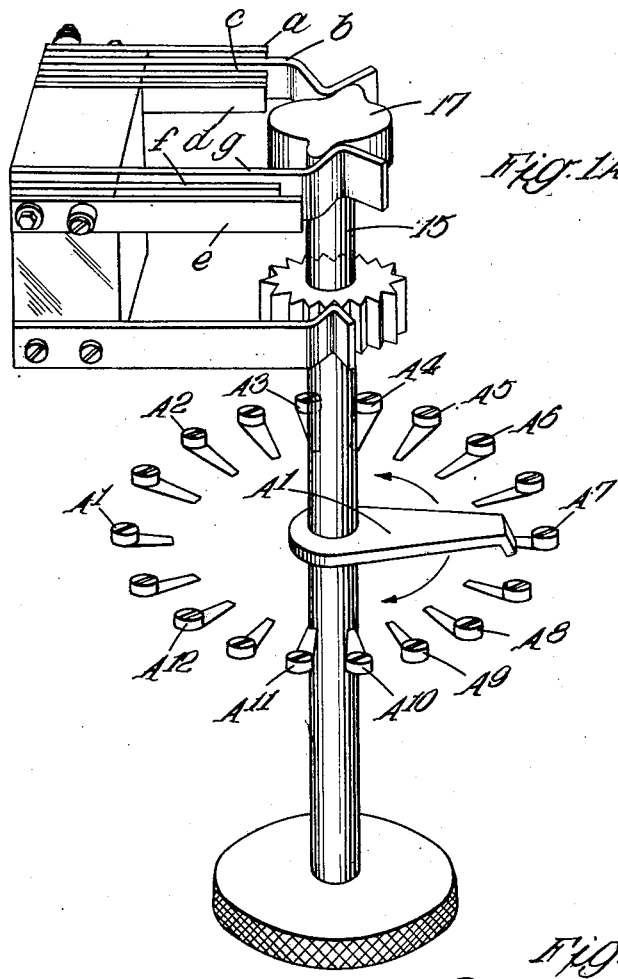
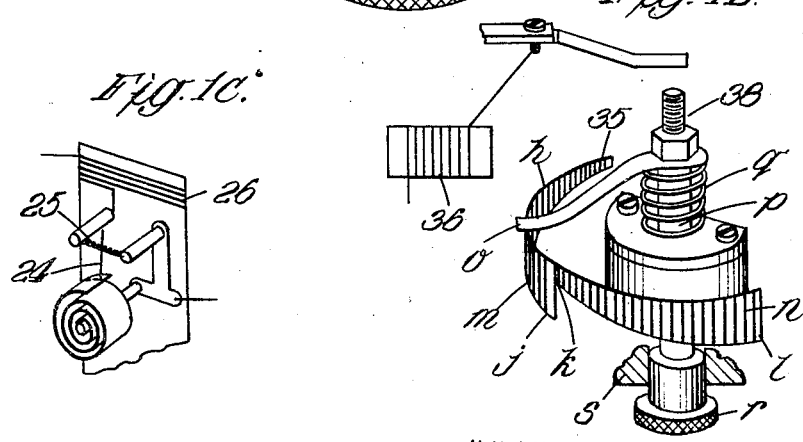
HUGH SUTHERLAND MACADIE
INVENTOR
By *[signature]*
His Att'y.

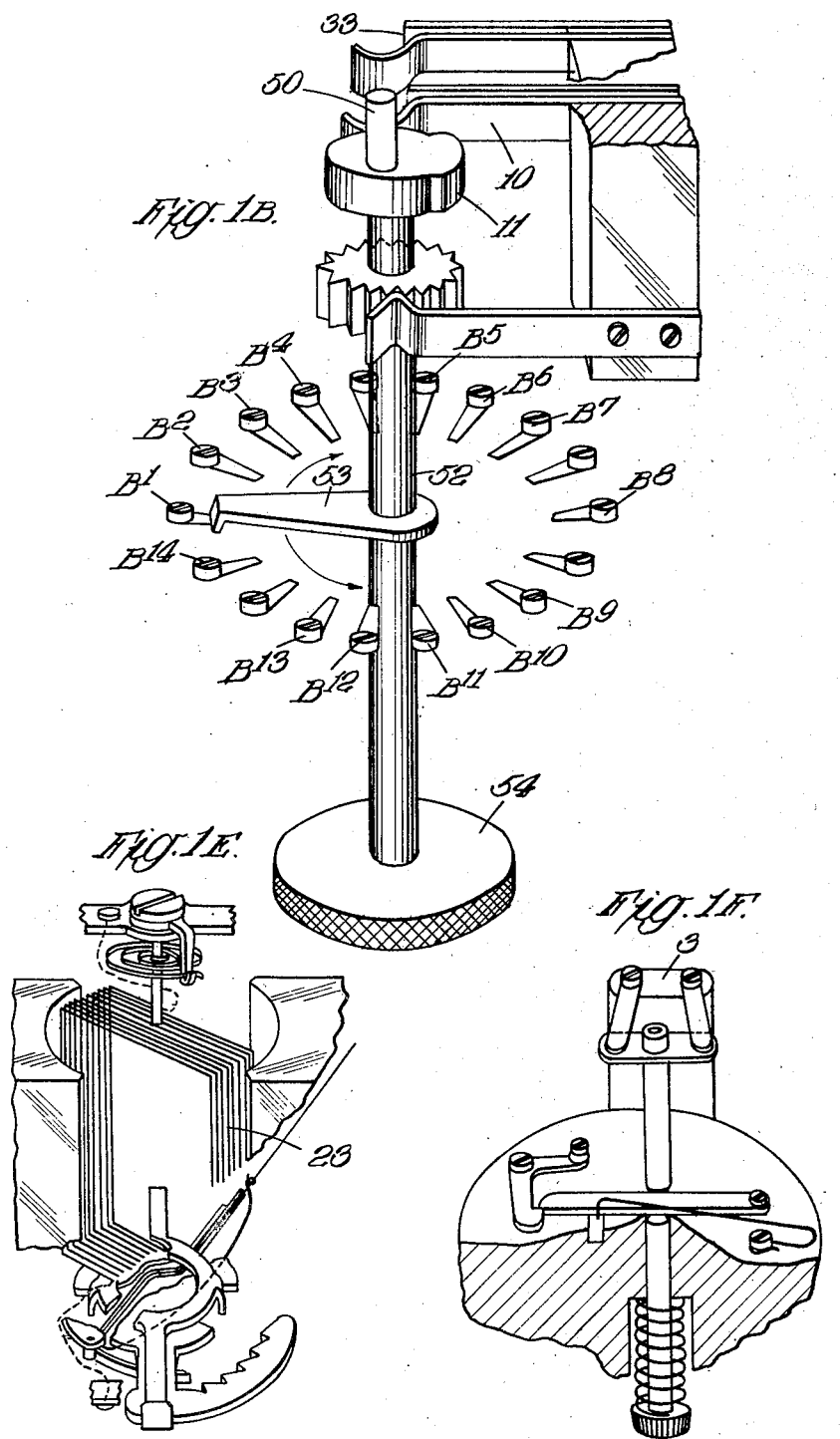

May 31, 1938.  H. S. MACADIE  2,118,933
MULTIRANGE ELECTRICAL MEASURING INSTRUMENT
Filed May 17, 1937   3 Sheets-Sheet 3

Hugh Sutherland Macadie INVENTOR

BY Otto Munk

ATTORNEY

Patented May 31, 1938

2,118,933

UNITED STATES PATENT OFFICE 2,118,933

MULTIRANGE ELECTRICAL MEASURING INSTRUMENT

Hugh Sutherland Macadie, Westminster, London, England

Application May 17, 1937, Serial No. 143,003
In Great Britain May 12, 1936

8 Claims. (Cl. 171—95)

This invention relates to improvements in multi-range electrical measuring instruments.

It is an object of the invention to provide a single instrument for measuring a plurality of current and voltage values, both A. C. and D. C. ohmic values using both A. C. and D. C. supply, measurements of capacity, power in a given load and decibels.

The invention will be described with reference to the accompanying drawings wherein Figures 1A to 1F show details of the instrument, whilst Figure 2 shows the circuit diagram.

The instrument comprises a 1 milliampere moving coil meter 23 of any known convenient type. In the preferred form it has, say, 50 ohms resistance and on normal current and voltage ranges is shunted over contacts 28, 38 by an equal resistance consisting of 20 ohms potentiometer 30 (for voltage adjustment on to low ohms ranges) and a 30 ohms fixed resistance 36. When the 50 ohm shunt contacts 28, 38 are made, a resistance 27 of 25 ohms is connected in series with the meter 23 and with the shunt resistance 30, 36. Switch 28 is also adapted to open the shunt circuit and to cut out the 25 ohms resistance 27 which is provided for the purpose of dividing the reading in half as explained in British Patent No. 423,190. Switch 28 is operated by a suitable button (not shown). The positive lead 22 to the moving coil meter 23 may be alternatively connected to the aforesaid shunt or to a shunt circuit including a graded variable resistance 35 having a fixed minimum resistance 37 of about 12 ohms in series and a total resistance of say 200 ohms. The spindle $p$ of switch 38 (Figure 1D) controlling the graded resistance 35 is capable of axial as well as rotational movement and also carries a brush $o$ which wipes over the graded resistance 35. This switch 38 when completing the circuit through the graded resistance 35 opens the circuit through the potentiometer 30 whereby the latter is rendered inoperative as well as its 30 ohms series resistance. This variable resistance serves to adjust for supply voltage on resistance, capacity and certain other tests as will become evident later.

In order that the invention may be more clearly appreciated, its various parts will be described in accordance with their function when a source of electric power supply is connected to the input terminals 1, 2. This supply, as will be evident later, may be either A. C. or D. C.

Referring now to those parts of the instrument required for the measurement of D. C. amps; associated with meter 23 is a fixed resistance tapped at 5, 6, 7, 8 by means of which tappings D. C. amperes of different ranges may be measured. The tappings 5, 6, 7, 8 are respectively connected by leads to studs B9, B10, B11 and B12 of a switch B (Figure 1B) having a brush 53 mounted on a rotatable spindle 52 which, upon being rotated manually by means of a suitable knob 54, causes the brush 53 to wipe over the aforesaid studs. The values of the resistances at the tappings are desirably such that they are adapted to cause maximum readings of 10, 1, 0.1 and 0.01 amps to be indicated by deflections of the moving coil 23 depending upon the stud on which the wiper 53 is resting. For example, the total value of the resistance may be 12.5 ohms tapped at 1.25, 0.125 and 0.0125 ohms.

The resistances are connectible to the meter in shunt therewith by means of contacts 10, closable by means of a cam 11 on the spindle 52 and contacts $a$, $c$ and $g$, $e$ closable by means of a cam 17 on the spindle 15 of a switch A (Figure 1A) to which reference will be made later.

Disposed in series with the meter 23 and with the fixed resistance 27 is a fixed resistance 26 and a variable resistance 25. This latter resistance (Figure 1C) has a slider 24 carried by a bi-metallic thermo-sensitive strip arranged in a manner such that some of the current passes therethrough. The purpose of this variable resistance 25 is to compensate for changes in ambient temperature and provides some correction for over-heating due to misuse of the meter, whereby the accuracy of reading may be retained within the limits of temperature compensation.

Also, in series with the meter and preferably in the positive lead is an automatic cut-out 3 (Figure 1F) of the type for example described in the specification of my co-pending United States patent application Serial No. 105,004.

When for certain purposes the instrument is required to deal with an excess current over that required to give full scale reflection, the excess current is drained away from the meter movement by means of a fixed resistance 37 and the graded variable rheostat 35 desirably having a maximum value of about 200 ohms. By this means it is possible to extend the usefulness of the instrument by increasing its scope. The resistance is composed of a former $h$ (Figure 1D) of insulating material bent almost into a circle, which has a portion of little width gradually increasing in width to about half way at $j$, whereafter it sharply diminishes in width as at $k$ and again gradually increases to the end point $l$. The first portion $h$—$j$ is wound with relatively thick resistance wire $m$ and the second portion with relatively thin resistance wire $n$. The graded resistance, thus provided, is adapted to be traversed by a contact $o$ mounted on a spindle $p$ capable of axial as well as rotational movement as indicated by the double headed arrows. A spring $q$ serves to urge the spindle $p$ to limit position in one direction of axial movement in which the contact arm is out of engagement with the resistance. The spindle $p$ is pulled against the action of the spring $q$ into its other limit position by a knob $r$ mounted thereon arranged externally of the casing (shown in part at $s$) containing the instrument. In this position the contact arm $o$ makes contact with the resistance $h$, the spindle $p$ being held in this position by a suitable spring detent or other means. The knob may now be rotated to place as much resistance in circuit as is desired.

It is preferred to arrange the spindle so that it is pulled outwardly to cause the arm to contact with the resistance. In order to ascertain when the resistance is in circuit, an indication may be provided conveniently in the form of a coloured say red, ring (not shown) adapted to be covered when the knob is pushed home and exposed when the knob is pulled out.

The graded resistance together with fixed portions 37 is connected in shunt with the 50 ohm moving coil movement by means of leads so that when placed in circuit it shunts from the moving coil any excess of current and may have, for example, a total resistance of 200 ohms. In the connection to the graded resistance there is also a fixed resistance 37 of, say, 12 ohms. It is desirable that the inclusion of the adjuster shall not alter the resistance of the meter on the ranges employed to any appreciable extent and that adjustment from ⅔ to 2½ times normal current consumption with 50 ohms shunt cross the moving coil, can be given.

When the graded resistance is in circuit, the resistance across the movement itself will vary in accordance with the position of the movable arm, but as the adjuster, when in use, is always in series with a high impedance in other parts of the instrument, any slight variation of movement resistance is swamped and may be considered constant.

The instrument is also adapted to measure D. C. voltages. For this purpose, a resistance is provided tapped at points 66, 67, 68, 69, 70 and connected to studs B14, B2, B1, B3, B4 of switch B marked for example 1,000, 400, 100, 10, and 1 volts. The desirable values of the resistances between the tappings to give these values are 300,000, 150,000, 45,000, 4,500, 450 ohms respectively. These resistances are in series with the meter 23 and by setting the switch to any one of the studs B14, B2, B1, B3, B4, the meter will indicate the voltage within the range appropriate to the stud on which it is placed. The scope adjuster 35 and temperature compensator 25 previously mentioned are used in the same manner as before.

To measure D. C. resistance, three further contacts B5, B6 and B7 are provided on the switch B respectively, assigned to the 10,000 ohm, 100,000 ohm, and 1 megohm positions. The first two, B5 and B6, are connected to the low and high ends of fixed resistance 47—48 of 516.5 ohms, tapped at a point 46 corresponding to 43.5 ohms between points 46 and 47 and the tapping connected to a variable rheostat 44 of approximately 4 ohms. The one megohm position B5 of the switch B is connected through resistance 51 of 4,960 ohms to the positive of a 9 volt internal battery 42, the negative of which is connected to the negative of a 1½ volt cell 41 and to the contact arm 31 of the rheostat 30.

Disposed between the negative ends of the cells 41, 42 and the meter 23 is a low resistance 32 of say 2.56 ohms which is adapted to be switched into circuit by means of a pair of contacts 33 closable by a projection 50 (Figure 1B) eccentric to the axis of spindle 52 of the switch B when this switch is in position for reading the lowest range of ohms. This resistance 32 is in shunt with the shunted meter 23.

Besides being able to be employed for making the aforesaid D. C. measurements the instrument is also capable of making A. C. measurements. To this end switch B is set on contact B8 which has the effect of connecting terminals 1, 2 of the instrument to the brush 55 of A. C. switch A.

The brush of switch A normally rests on a contact $A^1$ marked D. C. when switch B is operated for effecting D. C. measurements and is also provided with a cam 17 mounted on its spindle 15 adapted to open and close two sets of contacts $g, e, f,$ and $a, b, c, d$. The arrangement of the cam and contacts is such that when instrument is set for D. C. measurements, contacts $a, c,$ and contacts $e, g$ are closed whilst when the A. C. switch A is on a contact other than that marked D. C. contacts $a, c; e, g$ are open whilst contacts $a$ and $b, c$ and $d$, and $e$ and $f$ are closed.

The effect of closing contacts $c, d$ is to switch into circuit on volts the primary P of a transformer T having 5,000 turns tapped at 1, 10, 100, 318, 500 and 1,000 turns which are respectively connected to contact studs A6, A5, A4, A12, A11 and A3 of the switch A. Of these studs A6, A5, A4 and A3 are immediately adjacent to one another and by connecting the wiper 55 to them any one of four ranges of alternating currents (say 10 amps, 1, 0.1 and 0.01 amp for full scale deflection on each range) may be measured.

The closure of contacts $a, b$ and $e, f,$ has the effect of connecting a full wave rectifier 14 into circuit across the terminals of the meter 23. The rectifier is also connected to the secondary winding 18 of the transformer.

A rectifier 20 is also connected in shunt with the meter for the purpose of protecting the meter should the instrument be connected to the terminals of an A. C. supply when the switches A, B are set for the measurement of D. C. values. The effect of the rectifier 20 is to cause the coil of the meter to swing in a positive direction from zero. The resistance 26 in series with the meter and rectifier is retained for the purpose of causing more current to flow in one direction than the other to accelerate the movement of the meter coil and consequently cause operation of the cutout. Desirably this rectifier is of the copper-oxide type.

To measure A. C. volts, switch A is set to one of terminals A11, A9, A10, A8 depending upon the range desired. In the preferred form these terminals are arranged for 10, 100, 400 and 1,000 voltages respectively. A11 is connected through a 480 ohm resistance 65 to the 500 turn tapping on the primary of the transformer. A9 is connected to a point in resistance 68—69 having a value of 48,450 ohms approximately. This resistance 68—69 is also in series over contacts $c$, $d$ with the primary of the transformer winding. Contact A10 is connected to a point 71 having a value of 196,950 ohms approximately, whilst A8 is connected to point 66 having a value of 500,000 ohms approximately.

Means are provided for measuring capacity. To this end a 1 mf. condenser 61 is connected to stud A2 and to the 318 tapping of the primary winding of the transformer, the arrangement being such as to give a full scale deflection (corresponding to an infinite capacity) on the voltage supplied, this being regulated by means of the graded resistance 35. For practical purposes the impedance of condenser 61 (1 mfd.) is taken as 3180 ohms at 50 cycles and the transformer tapping is such that 31.4 milliamps will give a full scale deflection on the meter 8 (corresponding zero external capacity). Hence, with these values, if a hundred volts be applied across condenser 61 there should be a full scale deflection. Should such not be the case, suitable adjustment may be effected by means of the graded resistance 35. Upon connecting the unknown capacity in series with condenser 61 the circuit corresponds to two impedances in series and the capacity is read directly on the capacity scale. Desirably a resistance of approximately 200 ohms is connected in series with the condenser to restrict the current if connection is made to the mains on the voltage peak of a cycle. The unknown capacity will be connected in series to the input to the instrument and the capacity will be read directly upon the capacity scale.

As an alternative, the load resistance 62 for power and decibels, may be connected in series with a large capacity condenser.

It will be appreciated that the condenser 61 and also the series resistance included in the primary circuit will act as a safeguard to the meter in the event of a breakdown of an unknown condenser under test, whilst the graded resistance will, of course, be made to give adequate compensation for variation in mains supply from about 70 to 250 volts of commercial frequency.

The instrument is also capable of measuring power. To this end switch A1 is set to stud A12 which is connected to turn 318 on the primary through a load resistance 62. The power scale which may be arranged to cover a range up to 4 watts, corresponds to the power absorbed in the range of 4,000 ohms in the meter itself. The scale markings correspond to $I^2R$ readings.

The power range is also shown with a scale marked in decibels, the zero level may conveniently be at the conventional level of 50 millivolts on the power scale. The remainder of the markings may bear the recognized relationship on the power scale.

The values for the various resistances and tappings on the primary of the transformer above referred to must not be taken to be in any way limitative, as they are given merely as examples of one instrument and for the purpose of facilitating the explanation of the present invention. The same would, of course, be varied to suit other moving coil meters and other ranges of voltage and current measurements if the same be desired.

I claim:—

1. In combination with an electrical instrument for making measurements by means of a single moving coil direct current meter, means for shunting away current from the meter in excess of that required to give full scale deflection thereof comprising an adjustable graded resistance, a fixed resistance in series with said graded resistance, means for connecting both of said resistances in shunt with said meter comprising a spindle mounted to move longitudinally along its axis, an arm on said spindle, adapted to wipe over said graded resistance, resilient means for normally maintaining the spindle in a position in which the arm is out of contact with said graded resistance, a fixed resistance, a pair of contacts normally maintained closed by said resilient means for connecting said fixed resistance in parallel with said meter and means operable upon the spindle being moved to a position in which the arm is in contact with the graded resistance for simultaneously maintaining the arm in contact with the graded resistance and opening said pair of contacts, whereby said fixed resistance is disconnected from said meter and said graded resistance is connected in parallel with said meter.

2. In combination with an electrical instrument for making measurements by means of a single moving coil direct current meter, means for shunting away current from the meter in excess of that required to give full scale deflection thereof comprising an adjustable graded resistance, a fixed resistance in series with said graded resistance, a second fixed resistance, switching means for alternatively connecting the graded and first fixed resistance or the second said fixed resistance in parallel with said meter, said switching means comprising a spindle mounted to move longitudinally along its axis, an arm on said spindle adapted to wipe over said graded resistance, resilient means for normally maintaining the spindle in a position in which the arm is out of contact with said graded resistance, a pair of contacts normally maintained closed by said resilient means for connecting said second fixed resistance in parallel with said meter and means operable upon the spindle being moved to a position in which the arm is in contact with the graded resistance for simultaneously maintaining the arm in contact with the graded resistance and opening said pair of contacts, whereby said fixed resistance is disconnected from said meter and said graded resistance is connected in parallel with said meter.

3. An electrical instrument for making both A. C. and D. C. measurements comprising a single pair of input terminals, a single moving coil direct current meter, means for rectifying alternating current, switching means for alternatively connecting said meter either to said terminals or to said rectifying means, a transformer having primary and secondary windings, circuit connections between said rectifying means and said secondary winding, switching means between said terminals and said transformer having a number of terminals each connected to a different point in said primary winding, a resistance connected between one of said switch terminals and points in the primary winding, a condenser connected between one of said switch terminals and points in the primary winding, and means for shunting away current in excess of that required to give full scale deflection thereof comprising an adjustable resistance connectible in shunt therewith.

4. An electrical instrument for making both A. C. and D. C. measurements comprising a single pair of input terminals, a single moving coil direct current meter, means for rectifying alternating current, switching means for alternatively connecting said meter either to said terminals or to said rectifying means, a transformer having primary and secondary windings, circuit connections between said rectifying means and said secondary winding, switching means between said terminals and said transformer having a number of terminals each connected to a different point in said primary winding, a resistance connected between one of said switch terminals and points in the primary winding, a condenser connected between one of said switch terminals and points in the primary winding, a resistance connected in series with said condenser, and means for shunting away current in excess of that required to give full scale deflection thereof comprising an adjustable resistance connectible in shunt therewith.

5. In combination with an electric instrument for making both A. C. and D. C. measurements by means of a single moving coil direct current meter, means for causing the coil of the meter always to swing in a positive direction from zero when connected to an A. C. source of electrical supply, means for shunting away current from the meter in excess of that required to give full scale deflection thereof comprising an adjustable graded resistance, a fixed resistance in series with said graded resistance and means for connecting both of said resistances in shunt with said meter.

6. In combination with an electric instrument for making both A. C. and D. C. measurements by means of a single moving coil direct current meter, means comprising a rectifier connected in shunt with said meter for causing the coil of the meter always to swing in a positive direction from zero when connected to an A. C. source of electrical supply, means for shunting away current from the meter in excess of that required to give full scale deflection thereof comprising an adjustable graded resistance, a fixed resistance in series with said graded resistance and means for connecting both of said resistances in shunt with said meter.

7. In combination with an electrical instrument for making measurements by means of a single moving coil direct current meter, means for shunting away from the meter current in excess of that required to give full scale deflection to the meter, said means comprising an adjustable graded resistance having at least two serially related expanding portions, means for connecting said resistance in shunt with said meter, contact means adapted to wipe over said graded resistance and means for bringing said wiping means in operative position with respect to said graded resistance.

8. In combination with an electrical instrument for making measurements by means of a single coil direct current meter, a fixed resistance connected in series with said meter, a variable resistance connected in series with said meter and parallel to said fixed resistance, said variable resistance having two serially related stages each expanding according to a predetermined form, and means to alternatively connect said fixed and said variable resistance in shunt with said meter, said connecting means comprising a wiper contact adapted to wipe over said graded resistance when the variable resistance is connected in shunt with said meter.

HUGH SUTHERLAND MACADIE.